United States Patent Office 3,340,927
Patented Sept. 12, 1967

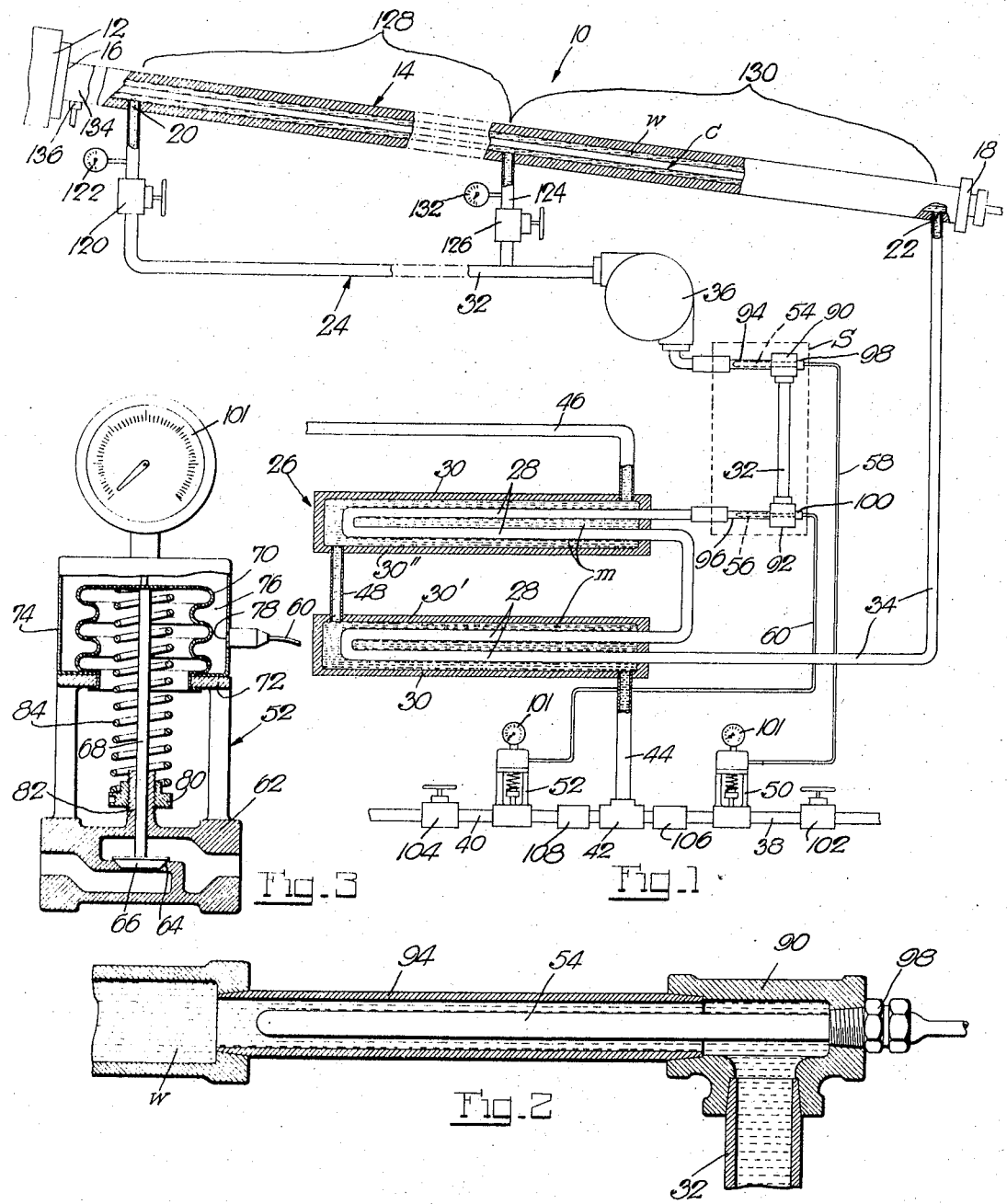

3,340,927
COOL-DOWN APPARATUS FOR CONTINUOUSLY EXTRUDED POLYOLEFIN
Donald A. Swindells, Mystic, Conn., assignor to Crompton & Knowles Corporation, Worcester, Mass., a corporation of Massachusetts
Filed Jan. 18, 1966, Ser. No. 521,326
8 Claims. (Cl. 165—39)

ABSTRACT OF THE DISCLOSURE

The disclosure deals with a circuitous path for water or any other suitable liquid to cool extruded polyolefin stock on its path through a longitudinal tube which at least over part of its longitudinal extent is included in the path, and a conductance-type heat exchanger in this path in which the water is subjected to a temperature-modifying medium the temperature of which is varied by control means responsive to temperature fluctuations of the water at a local station of the path.

---

This invention relates to the curing and/or cooling of continuously extruded plastic in general, and to apparatus therefor in particular.

Continuous extrusion of polyolefins particularly, though not exclusively, as insulation directly on conductor wire, while highly attractive due to the low cost of such insulation and its entirely adequate insulating properties, has not come into wide use owing to difficulties encountered in keeping the extruded product free from permanent defects in the course of its operational cool-down. Thus, extruded polyolefins of thermosetting and/or thermoplastic properties require, in contrast to extruded rubber insulation, rather closely graduated cooling over a relatively wide temperature range in order to be free from such fatal defects as internal voids or external ruptures caused by internal stresses that develop on even the slightest deviation from their normal shrinkage pattern in the course of operational cooling. The only feasible cooling procedure followed at present involves the passage of the extruded product through open troughs that are usually divided into successive zones in which water is maintained at different temperatures. However, this procedure has several drawbacks, in that it affords at the most a limited number of temperature-graduated zones of which the temperatures in the different zones are necessarily at considerable variance in order that the total zones may cover the entire temperature range required for cool-down of the extruded product to the usual extent for safe further disposal of the same. This makes it rather difficult to achieve normal shrinkage of the extruded stock, and occasionally gives rise to defects in the latter on rather slight and sometimes unavoidable changes in the prescribed temperature differentials between the relatively few zones. Further, open water troughs of graduated temperature zones are necessarily of exceeding length to achieve at modern extrusion rates normal stress-free shrinkage of the extruded stock from its cooling alone, resulting in relatively high operating cost of the trough equipment and wide exposure of the water therein to the contaminating effects of surrounding dust and other impurities, as well as in an excessively long passage of the extruded product through the water zones in the course of which the still soft extruded stock may be marred all too easily on even its briefest contact with a trough wall or other impediment.

It is the primary aim and object of the present invention to provide apparatus in which a continuously extruded product of this kind is cooled-down assuredly without sustaining any defects, by subjecting the product to accurately controlled and maintained temperatures of particularly close graduation over the entire cooling range at which shrinkage of the extruded stock is forced inescapably into its normal pattern.

It is another object of the present invention to provide cool-down apparatus of this kind which provides for continuous circulation of temperature-modifying water through a single-zone cooling component in which it is in heat-exchange relation with and flows counter to the continuously passing extruded product therein, thereby to establish throughout the extent of this single zone a temperature range of infinitely varying temperatures as a basic principle in the performance of the apparatus. Performance of the apparatus in accordance with this principle not only affords the utmost in graduated cooling of the extruded product for its entirely stress-free and, hence, defectless production, but it also permits the arrangement of the cooling component in the simple structural form of a conventional continuous rubber vulcanizing tube into which the extruded product passes directly and in which the temperature modifying water may furthermore be advantageously kept under suitable pressure to assist in and assure normal shrinkage of the extruded plastic of the product within the required temperature range in a tube of relatively short length. Moreover, the arrangement of the cooling component in tube form further permits the establishment therein next to the extruder head of a steam zone in which crosslinked polyolefin insulation of thermosetting properties is cured, with the remainder of the tube serving as a water leg through which the temperature-graduated water circulates.

It is a further object of the present invention to provide cool-down apparatus of this kind in which the cooling water passes on its circuitous path from and to the aforementioned tube through a heat-exchanger in which its temperature is modified so that it constantly enters the tube at substantially the same set temperature, whereby it is left solely to the continuously passing extruded stock in the tube to temper the counter-flowing water for its advantageous exceedingly gradual rise in temperature all the way to its exit from the tube, and the temperature range of the circulating water over the extent of the tube will, on continuous uniform product extrusion and despite operational fluctuation of the extrusion temperature of the stock, remain sufficiently constant for full flawless cool-down of the stock on its brief pass through the tube.

Another object of the present invention is to provide cool-down apparatus of this kind in which the operational cooling water is by conductance temperature-modified in the aforementioned heat exchanger, with the temperature-modifying medium in the exchanger being temperature-regulated by controls which respond to variation of the temperature of the operating cooling water at a local station of its circuitous path. With this arrangement, any such local temperature variation of the operating cooling water as may occur, while signalling for corrective temperature modification of this water, is responded to by the temperature modifying medium in the exchanger, and it is only through heat-exchange with the responding medium that the cooling water will respond to the corrective temperature modification of this medium, but at a rate at which highly objectionable hunting or surging of the water temperature is avoided yet the level of the latter at the exit end of the exchanger is at all times within a range at which the cooling water will successfully cope with any and all temperature fluctuations of the extruded stock.

A further object of the present invention is to provide cool-down apparatus of this kind in which the temperature modifying medium in the heat-exchanger is advantageously circulating water or steam, or both, supplied under tap or like pressure and from a steam line, respectively. With this arrangement, the temperature modifying medium in the heat exchanger may by the controls be made to respond as quickly and widely to signalled temperature modification demands of the operating cooling water as will bring about fairly rapid and always effective temperature response by the cooling water without giving rise to hunting or surging of its temperature.

It is another object of the present invention to provide cool-down apparatus of this kind in which the infinitely varying temperature of the cooling water may over the extent of the tube through which it passes be further varied by selective zoning of the tube into sections in which the temperature graduation of the water proceeds more rapidly or still more gradually, for close adaptation of the water temperature to the most exacting temperature requirements of extruded stock for its normal shrinkage to completion. This is achieved by providing between the tube intermediate its ends and the water return passage from the tube to the heat-exchanger a valve-controlled by-pass through which the circulating cooling water may in valve-regulated amounts be at least partially diverted from the tube zone ahead of the by-pass.

It is a further object of the present invention to provide cool-down apparatus of this kind in which there is provided in the aforementioned water return line from the tube a valve by which to throttle to varying degrees the water return flow and thereby variably extend the graduated water temperature range over the tube.

Another object of the present invention is to provide cool-down apparatus of this kind in which the aforementioned controls for supplying the heat-exchanger with water and steam are temperature regulator valves settable to different temperatures at which they will open, and these controls respond to temperature fluctuations of the operating cooling water at the aforementioned local station of its circuitous path by being actuated by temperature probes at that station which determine the degree of opening of the respective valves necessary for correct temperature modification of the cooling water. With this arrangement, the graduated temperature range of the cooling water in the tube may readily be varied to meet the exact cool-down requirements of any extruded stock, and the apparatus will at any graduated temperature range of the cooling water in the tube undertake correct and accurate temperature modification of the cooling water in response to operational temperature fluctuations of the latter.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a diagrammatic view, partly in section, of cool-down apparatus embodying the present invention;

FIG. 2 is an enlarged, fragmentary section through a temperature control component of the apparatus; and FIG. 3 is a more or less diagrammatic section through another temperature control component of the apparatus.

Referring to the drawings, and more particularly to FIG. 1 thereof, the reference numeral 10 designates apparatus for operational cool-down of polyolefin stock continuously extruded especially, though not exclusively, as insulation directly on a core of conductor wire or cable to form an insulated conductor $c$. To this end, the conductive core is continuously passed through a side-delivery head 12 of a conventional extruder wherein the polyolefin insulation is extruded directly onto the passing core, with the insulated conductor $c$ thus formed then passing directly into a cooling component 14 of the apparatus 10.

In accordance with one aspect of the present invention, the cooling component 14 is advantageously in the structural form of a continuous vulcanizer tube as commonly used in curing and cooling extruded rubber insulation on a conductor core, except that the present tube 14 contains as the operational or acting medium merely a cooling agent, preferably water $w$, for treating polyolefin insulation of mere thermoplastic properties. The tube 14 is closed to the outside, with the insulated conductor $c$ longitudinally passing therethrough in suitable sealed fashion at the inlet and outlet ends 16 and 18 of the tube.

In accordance with another aspect of the present invention, the apparatus 10 has provisions for continuously passing through the tube 14 water $w$ which, moreover, is circulated in a closed path in which it is also subjected to temperature modification. To this end, there is provided between the water discharge and admission ports 20 and 22 in the tube 14 conduit means 24 in which a heat-exchanger 26 is interposed. More particularly, the heat-exchanger 26 is of conductance type, including a part of the conduit means 24, in this instance in the form of two successive coils or loops 28, in heat-exchange relation with a temperature-modifying medium $m$ in successive casing sections 30 of the heat-exchanger 26. With the circulation of the cooling water $w$ being preferably and advantageously counter to the passage of the insulated conductor $c$ through the tube 14, the conduit means 24 is further arranged as a water return conduit or section 32 from the discharge port 20 in the tube 14 to the inlet end of the conduit loops 28 of the heat-exchanger 26, and as a water delivery conduit or section 34 from the outlet end of the conduit loops 28 to the admission port 22 in the tube. Interposed in the conduit means 24, preferably in the water return section 32 thereof, is a power-driven pump 36 of preferably variable capacity for the continuous circulation of the water $w$ in its closed path 14, 24.

The temperature-modifying medium $m$ in the heat-exchanger 26 is preferably and advantageously water or steam, or both, which in performance of the apparatus passes continuously through the exchanger 26 and is supplied from a water line 38 of tap or like pressure or from a steam line 40, or from both. To this end, the water and steam lines 38 and 40 join at 42 with an inlet conduit 44 to the first casing section 30' of the exchanger 26, and the second casing section 30" of the latter is provided with a discharge conduit 46 that leads to the atmosphere, with a conduit 48 connectnig the two casing sections 30 in such wise that the temperature-modifying medium $m$ passes through the latter in opposite directions.

In accordance with another aspect of the present invention, the temperature-modifying medium $m$ in the heat-exchanger 26 is temperature-regulated by controls which respond to variations of the operating cooling water $w$ at a local station S of its circuitous path. To this end, flow-regulator valves 50 and 52 are provided in the water and steam lines 38 and 40, respectively, which may be diaphragm-controlled, and temperature probes 54 and 56 are provided in the circuitous water path at the station S, with the probes 54 and 56 containing suitable thermally expansive and contractive fluid which through lines 58 and 60 is operatively connected with the respective valves 50 and 52 for acting on their diaphragms. The flow-regulator valves 50 and 52 may be of any suitable kind, for example of the commercially available kind illustrated more or less diagrammatically in FIG. 3. The exemplary valve 52 there shown is adapted for the steam line 40 (FIG. 1), and comprises a casing 62 with a seat 64 for a valve element 66 having a stem 68 that is connected with a diaphragm 70, in this instance a bellows, which is mounted on a platform 72 of the valve casing 62. Also mounted on the platform 72 is a cup-like element 74 which forms a closed chamber 76 around the bellows 70 on the outside, with the probe line 60 being at 78 in communication with the chamber 76. Surrounding the stem 68 of the valve element 66 and interposed between the bellows 70 and a nut 80 on a threaded valve-guiding shank 82 of the valve casing 62 is a compression spring 84 which through intermediation of the bellows 70 urges the valve element 66 to open with a force depending on the compression of the spring 84 as adjusted by the nut 80. In operation, assuming that the probe 56 at station S in the closed water circuit (FIG. 1) is subjected to water which is below a set temperature for proper performance of the apparatus, the probe fluid will respond in thermal contraction and thus reduce its pressure exertion on the bellows 70 in the chamber 76 (FIG. 3) to the extent where the spring 84 will open the valve element 66 for the admission of steam to the heat-exchanger 26. Conversely, if the same probe 56 is subjected to water which is at or above the set temperature, the probe fluid will thermally expand to an extent where its pressure exertion on the bellows 70 will overcome the compression of the spring 84 and close the valve element 66.

The other flow-regulator valve 50 in the water line 38 may be exactly like the valve 52 in FIG. 3, except that it is of reverse action by opening the valve element in response to increasing pressure exertion on its bellows of the fluid in the probe 54 when the water to which it is subjected at station S in the closed water circuit is of higher than a set temperature for proper performance of the apparatus.

The station S of the closed water circuit in which the probes 54 and 56 are arranged is preferably in the water return section 32 in close proximity to the heat-exchanger 26 (FIG. 1) so that the flow-regulator valves 50 and 52, and therewith the heat-exchanger 26 will respond most effectively to the temperature of the cooling water just before its temperature modification in the exchanger 26. More particularly, the probes 54 and 56 are mounted in successive T-fittings 90 and 92, and project into tube parts 94 and 96, of the water return section 32 (FIGS. 1 and 2), with the mounted ends of the probes 54 and 56 being at 98 and 100 connected with their respective fluid lines 58 and 60.

The water and steam lines 38 and 40 are also provided with shut-off valves 102 and 104 ahead of the respective regulator valves 50 and 52 whereby to disconnect the heat-exchanger 26 from its water and steam supply in non-operating condition of the apparatus. Also, check valves 106 and 108 are provided in the water and steam lines 38 and 40 immediately beyond the respective flow regulator valves 50 and 52, thereby to keep water or steam admitted to the heat-exchanger 26 from the respective steam and water lines 40 and 38.

The flow-regulator valves 50 and 52 will open at predetermined pressures of the fluid in the respective probes 54 and 56. Thus, these valves may be arranged to open at substantially the same probe fluid pressure which corresponds to a predetermined correct temperature of the cooling water at the station S of the closed water circuit, in which case the valve 52 in the steam line 40 will open substantially at this predetermined water temperature and remain variably open at varyingly lower than the predetermined water temperature, while the valve 50 in the water line 38 will open substantially at this predetermined water temperature and remain variably open at varyingly higher than this predetermined water temperature, all to the end of modifying in the heat-exchanger 26 the temperature of the cooling water so that on its continuous pass through the station S of the closed water circuit it has thereat a temperature equal or at least close to the predetermined temperature.

In operation of the apparatus, i.e., with the pump 36 operating and insulated conductor c passing continuously through the tube 14 and with the shut-off valves 102 and 104 in the water and steam lines 38 and 40 open, cooling water at a temperature modified in the heat-exchanger 26 will at 22 enter the tube 14 and therein flow counter to the passing insulated conductor c until leaving the tube through the discharge port 20 for its renewed temperature modification in the heat-exchanger 26. The cooling water thus passing through the tube 14 in heat-exchange relation with the therein passing insulated conductor will pick up heat from the extruded insulation of the latter and thus undergo a gradual increase in its temperature which reaches a maximum at the discharge port 20. The insulation of the conductor c is thus subjected on its pass through the tube 14 to water which is of maximum temperature on initial contact therewith and which is of gradually decreasing temperature as the insulated conductor further advances in the tube. It is this exposure of the extruded polyolefin insulation to the gradually varying temperatures of the cooling water in the tube which makes for normal, rather than abnormal, shrinkage of the insulation at which the same sustains no defects, especially since the temperature graduation of the water in the tube, being established solely by the extruded insulation, is so very gradual as to be infinite over the temperature range of the water in the tube. Thus, with the flow-regulating valves 50 and 52 and the responding heat-exchanger 26 performing to keep the temperature of the circulating water in the tube 14 within a range at the upper limit of which the extruded insulation is neither overheated nor nearly chilled to an extent at which abnormal shrinkage of the same would occur, and at the lower limit of which operational shrinkage and adequate cool-down of the same are assuredly concluded, the exceedingly gradual variation in the temperature of the water in the tube over this entire temperature range induces entirely normal, and does not give the slightest rise to any abnormal, shrinkage of the extruded insulation, with ensuing entirely defectless production of the insulated conductor c. With the flow-regulator valves 50, 52 and the heat-exchanger 26 being arranged to establish for the circulating water in the tube 14 a mean temperature range which is known to be well suited for proper cool-down of a particular extruded polyolefin insulation on the conductor, this mean temperature range will be maintained rather accurately despite factors, such as inevitable fluctuations, more or less, in the extrusion temperature of the insulation, for example, which tend to vary this temperature range. This is due to the fact that the flow-regulator valves 50 and 52 respond to the temperature of the water at the station S in the closed water circuit which reflects the actual upper limit of the water temperature range prevailing at any time in the tube 14, while the heat-exchanger 26 responds to these flow-regulator valves in keeping the circulating water at its entrance into the tube at the proper lower temperature limit at which it will on its succeeding pass through the tube reach substantially the upper limit of the mean water temperature range when exiting from the tube.

The instant apparatus is also suited for shifting the temperature range of the circulating water in the tube 14 upwardly or downwardly to adapt it for the exact cool-down requirements of different extruded polyolefin insulation requiring different cool-down temperatures of the circulating water. This is achieved by resorting to flow-regulator valves 50 and 52 which are presettable to open at different probe fluid pressures and, hence, at different temperatures of the cooling water on its passthrough the station S of the closed water circuit. Valves of this presettable type are well known and available on the market. In the case of the exemplary steam valve 52 (FIG. 3), the same may be thus preset for opening at different probe fluid pressures by adjustment of the nut 80 and corresponding increase or decrease of the compression of the spring 84. Thus, on adjusting the nut 80 to increase the compression of the spring 84, the valve 52 is set to open at higher temperature of the exiting cooling water from the tube 14, whereas adjustment of the same nut for decreasing the compression of spring 84 will result in opening of the valve 52 at lower temperature of the exiting cooling water from the tube, this occurring in an exemplary operation in which steam alone is called for to keep the temperature of the exiting water from the tube from dropping below the upper limit of the selected water temperature range in the tube. Under these conditions, the assuming that the steam valve 52 is set for a certain water temperature range in the tube 14, this valve will open and admit steam to the heat-exchanger 26 when the exit temperature of the water from the tube drops below the upper limit of the selected water temperature range, and the same valve will close on rise of the exit temperature of the water from the tube to or above the upper limit of the selected temperature range, thus maintaining the temperature of the exiting water from the tube, and with it the temperature range of the water in the tube, substantially constant. The other valve 50 in the water line 38 will on different settings perform similarly as the steam valve 52 in exemplary operations in which water alone is called for to keep the temperature of the exiting water from the tube from rising above the upper limit of the selected water temperature range in the tube. To assist in proper presetting of the flow-regulator valves for selected water temperature ranges in the tube, these valves are preferably provided with indicators 101 that may be graduated in temperature degrees and which indicate the particular water temperature for which the respective valves are set.

Permissible presetting of the flow regulator valves 50 and 52 in the water and steam lines 38 and 40 for opening at different fluid pressures of their respective probes also permits their setting for opening at overlapping probe fluid pressures with ensuing closer confinement of the actual water temperature range at any time in the tube to a selected mean temperature range. Thus, on setting the steam valve 52 to open at a certain minimal drop of the exit temperature of the water below the upper limit of the selected water temperature range, and on setting the water valve 50 to open at a certain minimal increase of the exit temperature of the water beyond the same upper limit of the selected water temperature range in the tube, the actual exit temperature of the water from the tube will at the most deviate only slightly from the upper limit of the selected water temperature range in the tube, as will be readily understood.

There is also preferably provided in the water return section 32 of the closed water circuit a valve 120 whereby selectively to throttle the passage of the circulating water through the tube 14 and thereby selectively increase the upper limit of the water temperature range in the tube and also broaden this temperature range without any other changes in the apparatus. With this arrangement the apparatus may further be adapted to still more exacting temperature requirements in the proper cool-down of a particular extruded polyolefin insulation. Advantageously, a thermometer 122 is provided in the water return section 32 just ahead of the valve 120 on which to read the temperature of the passing water as a guide to establish a desired upper limit of a thus expanded temperature range of the water in the tube.

For still further graduation of the water temperatures in the tube 14, the latter may also be zoned off into sections in which the temperature gradient of the cooling water varies. Thus, in the exemplary apparatus of FIG. 1 there is provided between the water return section 32 and the tube 14 intermediate its water admission and discharge ports 22, 20 a conduit 124 with a valve 126 which on opening by-passes at least part of the water in the tube around the zone 128 therein which extends from the conduit 124 to the water discharge port 20 in the tube. Thus, on selective opening of the valve 126 and selective opening or closing of the valve 120, any part or all of the water in the tube may circulate at infinitely varying temperatures through the zone 130 thereof, while the remaining part of the water in the tube may circulate at differently varying temperatures through, or remain trapped at an elevated temperature substantially in, the zone 128 of the tube 14. For convenience of observing the temperature of the by-passed water in the conduit 124 as a guide for opening the valve 126 for a desired water temperature gradient in the tube zone 130, there is provided in the conduit 124 a thermometer 132.

The arrangement of the insulation-cooling component 14 of the apparatus in a form similar to a continuous vulcanizer tube for extruded rubber insulation on a conductor also affords the advantage of keeping the circulating water therein under considerable operational pressure which assists in rapid and normal shrinkage of the extruded polyolefin insulation. To this end, the tube 14 is of considerably larger cross-sectional area as the conduit means 24, so that on the pump-induced circulation of the water in the closed circuit the pressure of the water is considerably higher in the tube 14 than in the remainder of the closed circuit. Further desirable variation of the pressure of the circulating water in the tube 14 may be achieved through operation of the pump 36 at varying capacity, as will be readily understood.

While the description so far dealt with the cool-down of extruded polyolefin insulation having only thermoplastic properties and, hence, requiring no vulcanization, the present apparatus is also adapted for vulcanization and proper cool-down of insulation of extruded polyolefins, such as cross-linked polyolefins, which besides thermoplastic properties have also thermosetting qualities and, hence, require vulcanization before cool-down. To this end, the cooling water leg in the tube 14 may at the water discharge port 20 stop short of the tube inlet end 16 for the extruded insulated conductor c to leave a tube zone 134 in which to introduce and maintain steam for the vulcanization of the extruded insulation prior to its passage into the cooling water in the tube. The tube 14 may within the confines of the steam zone 134 be provided with a steam inlet 136.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. Cool-down apparatus for continuously extruded polyolefin stock, comprising a longitudinal tube closed except for the longitudinal passage in sealed fashion of stock therethrough; means for moving stock through said longitudinal passage; a circuitous path for cooling water wherein said path includes the interior of the tube at least over part of its longitudinal extent; means for recirculating water in said path in a direction counter to that of the passing stock in said tube; a conductance-type heat-exchanger in said path in which the cooling water is subjected to temperature modification by a temperature modifying medium; and means including a control responsive to temperature fluctuations of the cooling water at a local station of said circuitous path for varying the temperature of said medium.

2. Cool-down apparatus as set forth in claim 1, in which said tube interior is of larger cross-sectional area than the remainder of said path so that the water flows at lower velocity and under higher pressure through said tube than through the remainder of said path.

3. Cool-down apparatus as set forth in claim 1, in which said means comprises steam and water conduits leading to said heat-exchanger, temperature probes in said path at said station, and flow regulator valves in said conduits operatively connected with and actuated by said probes, respectively.

4. Cool-down apparatus as set forth in claim 4, in which said flow regulator valves are diaphragm-controlled, and said probes contain thermally expansive and contractive fluid acting on the diaphragms of the respective valves.

5. Cool-down apparatus as set forth in claim 6, in which the diaphragms of said valves are variably spring-loaded in opposition to the thereon acting probe fluid, thereby to vary the water temperature at said station in said path.

6. Cool-down apparatus as set forth in claim 2, in which there is a return leg in said recirculating path with a flow-regulatable valve in said return leg.

7. Cool-down apparatus as set forth in claim 1, in which the tube part included in said circuitous path constitutes a water leg in said tube with inlet and outlet ends, and there is also provided a valve-controlled water return conduit from said water leg intermediate its ends to said heat-exchanger for selective division of said water leg into zones of different temperature graduations.

8. Cool-down apparatus as set forth in claim 1, in which said tube has stock inlet and outlet ends, and its interior also provides a steam zone extending to said stock inlet end, with said tube further having an inlet to said steam zone.

References Cited

UNITED STATES PATENTS

| | | | |
|---|---|---|---|
| 2,445,115 | 7/1948 | Hanrahan | 165—156 X |
| 2,541,201 | 2/1951 | Buecken et al. | 18—12 X |
| 2,555,012 | 5/1951 | Spofford | 165—26 |
| 2,808,235 | 10/1957 | Sollich | 165—26 |
| 3,227,207 | 1/1966 | Litman | 165—30 X |
| 3,270,806 | 9/1966 | Borrini | 18—12 X |

ROBERT A. O'LEARY, *Primary Examiner.*

M. A. ANTONAKAS, *Assistant Examiner.*